United States Patent
Turmeau et al.

(10) Patent No.: US 10,968,957 B2
(45) Date of Patent: Apr. 6, 2021

(54) METHOD OF DETERMINING WEAR IN A BEARING SURFACE

(71) Applicant: SKF Aerospace France S.A.S, Montigny-le-Bretonneux (FR)

(72) Inventors: Arnaud Turmeau, Mallisard (FR); Camille Dayot, Valence (FR)

( * ) Notice: Subject to any disclaimer, the term of this patent is extended or adjusted under 35 U.S.C. 154(b) by 0 days.

(21) Appl. No.: 15/973,813

(22) Filed: May 8, 2018

(65) Prior Publication Data
US 2018/0335091 A1    Nov. 22, 2018

(30) Foreign Application Priority Data
May 16, 2017 (GB) .................................... 1707793

(51) Int. Cl.
*F16C 41/00* (2006.01)
*F16C 23/04* (2006.01)
(Continued)

(52) U.S. Cl.
CPC ........ *F16C 41/007* (2013.01); *F16C 11/0647* (2013.01); *F16C 11/0661* (2013.01);
(Continued)

(58) Field of Classification Search
CPC .................. F16C 11/0647; F16C 11/0061; F16C 17/246; F16C 23/045; F16C 33/10;
(Continued)

(56) References Cited

U.S. PATENT DOCUMENTS 3,845,735 A * 11/1974 Bossier, Jr. ......... F16C 11/0614
116/208
4,237,613 A    12/1980 Slough et al.
(Continued)

FOREIGN PATENT DOCUMENTS

CA    2353280 A1    2/2002
CN    1573142 A    2/2005
(Continued)

OTHER PUBLICATIONS

Great Britain International Search Report dated Oct. 31, 2017 for corresponding Great Britain application No. GB1707793.4.
(Continued)

*Primary Examiner* — Marcus Charles
(74) *Attorney, Agent, or Firm* — Reed Smith LLP

(57) ABSTRACT

A method of determining an amount of wear in a spherical working surface of a bearing ring of a spherical plain bearing, the method including providing a reference groove of predetermined depth in an unworn working surface, using the reference groove and axial end faces of the bearing ring as reference surfaces for centering and aligning a measuring tool. The tool having a first surface, and a protrusion that extends from the first surface in radial direction and is adapted to fit into the reference groove and two or more radial openings that extend from a second surface of the tool. Determining the amount of wear by measuring the radial distance to the spherical working surface through each of the radial openings and comparing the measured value with a reference value measured using the tool for an unworn working surface comprising a reference groove of the same predetermined depth.

9 Claims, 2 Drawing Sheets

(51) Int. Cl.
  *F16C 33/10* (2006.01)
  *F16C 11/06* (2006.01)
  *G01B 13/14* (2006.01)
  *F16C 17/24* (2006.01)
  *G01B 7/26* (2006.01)
  *F16C 33/20* (2006.01)

(52) U.S. Cl.
  CPC ........ *F16C 17/246* (2013.01); *F16C 33/1095* (2013.01); *G01B 7/26* (2013.01); *G01B 13/14* (2013.01); *F16C 23/045* (2013.01); *F16C 33/10* (2013.01); *F16C 33/20* (2013.01); *Y10T 403/20* (2015.01)

(58) Field of Classification Search
  CPC .... F16C 33/1095; F16C 33/20; F16C 41/007; F16C 11/0661; G01B 7/26; G01B 13/28; G01B 13/18; G01B 13/44; G01B 5/18; G01B 13/14; G01M 13/04; Y10T 403/20
  USPC ....... 384/129, 203, 291, 295; 73/427, 865.8; 116/208, 296
  See application file for complete search history.

(56) References Cited

U.S. PATENT DOCUMENTS

| | | | |
|---|---|---|---|
| 4,765,757 A | 8/1988 | Hartl | |
| 5,451,110 A | 9/1995 | Gams, Jr. et al. | |
| 5,904,457 A * | 5/1999 | Suwijn | B23F 23/12 409/1 |
| 6,161,055 A * | 12/2000 | Pryor | G05B 19/4065 382/152 |
| 9,395,289 B2 * | 7/2016 | Manuel | G01N 3/56 |
| 9,482,270 B2 * | 11/2016 | Lovett | G01M 13/04 |
| 2004/0197038 A1 | 10/2004 | Fujita et al. | |
| 2006/0062502 A1 | 3/2006 | Hupp | |
| 2009/0205404 A1 * | 8/2009 | Swadling | G01M 13/04 73/7 |
| 2012/0306478 A1 | 12/2012 | Emenaker et al. | |
| 2016/0298691 A1 | 10/2016 | Dowie et al. | |

FOREIGN PATENT DOCUMENTS

| | | |
|---|---|---|
| CN | 101198800 A | 6/2008 |
| CN | 103998892 a | 8/2014 |
| CN | 106482647 A | 3/2017 |
| CN | 1363021 A | 8/2020 |
| DE | D33738753 C1 | 6/1989 |
| EP | 1704338 | 9/2006 |
| EP | 2886887 A1 | 6/2015 |
| EP | 2930381 A1 | 10/2015 |
| GB | 539920 | 9/1941 |
| GB | 984121 A | 2/1965 |
| GB | 1464017 A | 2/1977 |
| GB | 2273361 | 6/1994 |
| GB | 2421769 | 7/2006 |
| JP | H0478319 A | 3/1992 |
| JP | H11083409 | 3/1999 |
| WO | 2011098487 | 8/2011 |
| WO | 2012148899 A1 | 11/2012 |

OTHER PUBLICATIONS

French International Search Report dated Mar. 16, 2020 for corresponding National Registration No. FR1853646.

Chinese Office Action dated Oct. 28, 2020 for corresponding Chinese Patent Application No. 201810257145.8.

* cited by examiner

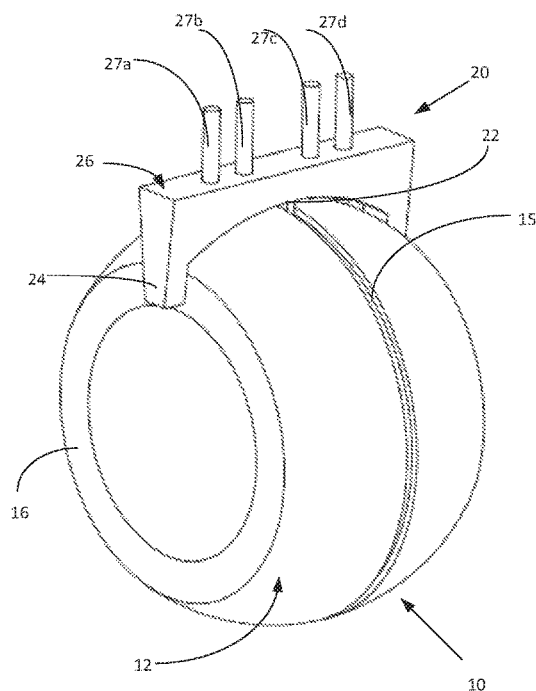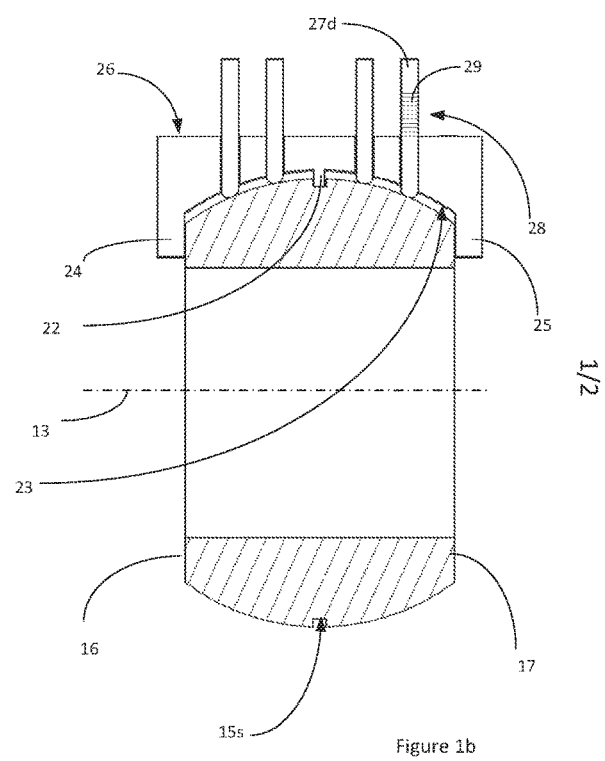
Figure 1a
Figure 1b

METHOD OF DETERMINING WEAR IN A BEARING SURFACE

CROSS-REFERENCE

This application claims priority to British patent application no. 1707793.4 filed on May 16, 2017, the contents of which are fully incorporated herein by reference.

TECHNOLOGICAL FIELD

The present invention relates to the measurement of wear in the working surface of a spherical plain bearing, to determine whether the bearing can be refitted or whether replacement is necessary.

BACKGROUND

An apparatus for measuring wear of rod end bearings is disclosed in U.S. Pat. No. 3,845,735. An indicator pin is mounted in a radially extending through-hole in the outer ring, such that one end of the pin is in contact with a spherical outer surface (working surface) at an axially central location of the inner ring, while the other end of the pin protrudes from the through-hole by a known amount when the bearing is in an unworn condition. After a period in service, wear is measured by compressing the bearing and manually depressing the pin until it contacts the working surface of the inner ring. A reduction in the amount by which the pin protrudes is indicative of wear.

This solution has the disadvantage that it is necessary to machine a cavity through the outer ring, which compromises its structural integrity. Also, it is possible to detect wear at only one location on the working surface. Depending on the application loads, the working surface may not experience a uniform amount of wear along an axial profile of the surface.

An example of a plain bearing with visual wear indication features is disclosed in GB 2421769. The plain bearing is a bushing whose outer surface is provided with shallow recesses of closely controlled radial depth, axial width and circumferential length. During a maintenance inspection, after a period of service in which wear will have occurred, the visual appearance of the worn pattern of recesses is compared with a chart which interprets the wear pattern and extent.

In applications where an amount of unacceptable wear is measured in the scale of microns, a visual comparison against a chart may not provide a reliable indication of the extent of the wear.

There is still room for improvement.

SUMMARY

The present invention resides in a method of determining an amount of wear in a working surface of a bearing ring of a spherical plain bearing using a specially adapted tool. The method comprises a step of providing a reference groove in the working surface. The reference groove and axial end faces of the bearing ring are then used as reference surfaces for centring and aligning the tool, which has the following features:
   a first surface adapted to face the working surface of the bearing ring, and a protrusion which extends from the first surface in radial direction and is adapted to fit into the reference groove;
   first and second clamping sections that engage opposite axial end faces of the bearing ring;
   two or more radial openings that extend from a second surface of the tool through to the first surface, and which are axially spaced from the protrusion; and
   a depth gauge associated with at least one of the two or more radial openings for measuring radial distance.

Wear is determined by using the tool to measure the radial distance to the working surface through each of the radial openings and comparing the measured value with a reference value measured for a working surface in unworn condition.

The method and tool of the invention thus enable wear of the working surface to be measured in a straightforward manner at a plurality of axially spaced locations. In a preferred example, the measuring tool has four more radial openings. Furthermore, the tool can easily be moved to different angular positions on the bearing ring.

In a first embodiment, the bearing ring is an inner ring of a spherical plain bearing, which has a spherically convex working surface. Suitably, the first surface of the tool then has a complementarily shaped concave curvature. In a second embodiment, the bearing ring is an outer ring of a spherical plain bearing, which has a spherically concave working surface. Suitably, the first surface of the tool then has a complementarily shaped convex curvature.

The tool may comprise any type of gauge that is suitable for measuring the depth of a blind hole. In one example, the gauge associated with each radial opening is a micrometre screw gauge with a shank that is inserted through each radial opening and adjusted until contact is made with the working surface. In other examples, a dial gauge or laser depth gauge is employed. The tool may comprise a depth gauge for each of the radial openings, or may comprise a single depth gauge that is axially movable. In an embodiment, the tool body comprises a slotted hole in which a laser depth gauge is arranged, the position of which is axially adjustable.

In an embodiment, the bearing ring is adapted for grease or oil lubrication and comprises an annular lubrication groove provided at an axially central location on the spherical working surface. The lubrication groove is then used as the reference groove for centring an aligning the measuring tool. Consequently, no additional modification of the bearing ring is required in order to implement the invention.

Such spherical plain bearings with an annular lubrication groove are referred to as metal-to-metal bearings, whereby the rings may be made of e.g. steel, titanium, bronze, a cobalt alloy or a nickel chromium alloy and may be provided with a surface coating of e.g. titanium nitride, chromium nitride or tungsten carbide.

In an alternative embodiment, the ring forms part of a self-lubricating bearing. For example, the outer ring of the spherical plain bearing may be provided with a liner on its working surface. The liner may comprise PTFE fibres bonded in resin to a backing material. Preferably, the liner is machinable, such that a reference groove can be machined into the surface of the liner.

Suitably, the reference groove has a depth relative to the spherical surface that is greater than a maximum allowable amount of wear.

The reference groove may be a continuous circumferential groove. Alternatively, the spherical working surface may be provided with a plurality of circumferentially spaced reference grooves. Suitably, the circumferentially spaced grooves are provided at an axially central location.

In bearings where the reference groove(s) and spherical working surface are manufactured with tight tolerances, the measuring tool may be calibrated with regard to a reference bearing ring and then used to determine an amount of wear on a bearing ring of the same kind. Alternatively, the tool may be calibrated with regard to a reference groove provided in a section of the working surface which, in use of the bearing, is located outside of a loaded zone of bearing and thus not subject to wear.

Thus, a straightforward method and tool for measuring wear of inner and outer spherical plain bearing rings is provided. Other advantages of the invention will become apparent from the following detailed description and accompanying drawings.

BRIEF DESCRIPTION OF THE DRAWINGS

FIG. 1a shows a perspective view of an inner ring of a spherical plain bearing;

FIG. 1b shows a cross-sectional view of a tool for measuring wear of a working surface of the inner ring;

DETAILED DESCRIPTION

Figure 2A:
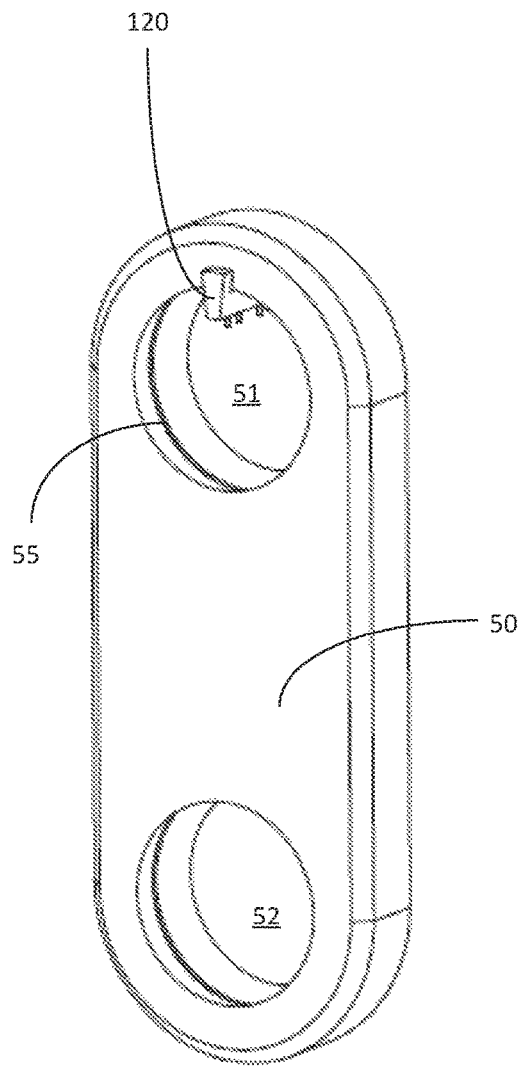
FIG. 2a shows a perspective view of a 2-point shackle having first and second bores, each of which serves as an outer ring of a spherical plain bearing.
Figure 2B:
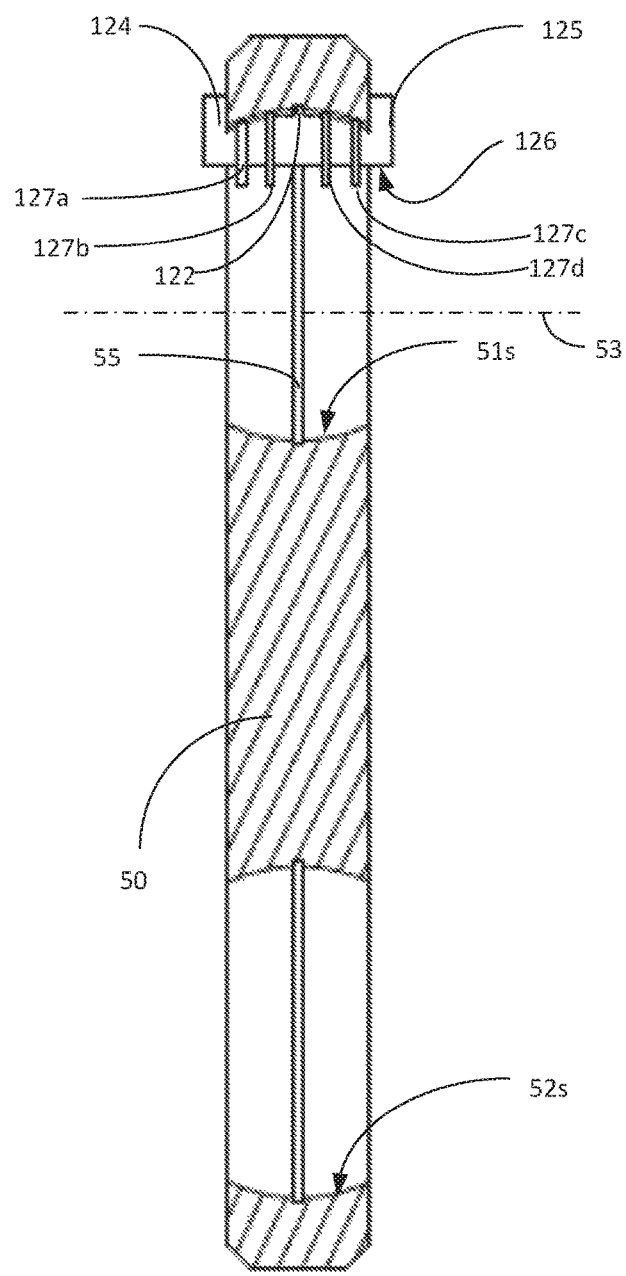
FIG. 2b shows a cross-sectional view of a tool for measuring wear of the working surface of the outer ring.

FIGS. 1a and 1b show an example of an inner ring 10 of a spherical plain bearing. In use of the bearing, a spherically convex surface 12 of the inner ring is in sliding contact with a spherically concave surface of an outer ring. The spherical contact surfaces allow the inner ring to rotate freely with multiple degrees of freedom while positioned within the bearing outer ring. This multiple movement capability enables the bearing to self-align such that it automatically adjusts to any misalignment which may occur under the application conditions. One application where spherical plain bearings are used is the suspension of an aircraft engine to a pylon structure that is attached to an aircraft wing. The engine may be mounted to the pylon via one more shackles, such as shown in FIGS. 2a and 2b, which will be described in more detail later.

In aerospace applications, where safety is a major consideration, critical components such as spherical plain bearings are subject to regular maintenance inspections. The bearing rings typically experience small, back and forth relative angular displacements, leading to wear of working surfaces of the rings that are in sliding contact with each other. Wear increases the operating clearance within the bearing, which reduces bearing life when the clearance becomes excessive.

Measuring wear is thus important and the present invention provides a straightforward method and tool for performing the measurement.

Returning to FIGS. 1a and 1b, the working surface of the bearing inner ring 10 is the spherically convex outer surface 12. In the depicted example, the bearing is adapted for oil or grease lubrication and the working surface 12 of the inner ring is provided with an annular groove 15 for distributing the lubricant. In the method of the invention, a recessed surface 15s of the groove serves as a reference surface for characterizing a surface profile of the working surface 12 using a tool 20, which has a protrusion 22 adapted to fit into the groove. Suitably, the recessed surface 15s has a predefined depth that is greater than an amount of wear that the bearing ring might experience during its service life.

The protrusion 22 extends in a radially inward direction, relative to a ring axis 13, from a first surface 23 of the tool, which fits over the working surface 12 of the inner ring 10. Preferably, the first surface 23 has a concave geometry that essentially complements the convex geometry of the working surface 12. The first surface 23 of the tool is axially delimited by first and second clamping sections 24, 25 which are adapted to bear against first and second end faces 16, 17 of the inner ring 10. In use, the tool 20 is thus centred on the annular groove 15 and aligned on the end faces of the bearing inner ring.

The tool further comprises a number of axially spaced through holes that extend in radial direction from a second surface 26 of the tool to the first surface 23. In each through hole, a depth gauge 27a, 27b, 27c, 27d is provided. Any kind of analogue or digital depth gauge may be used. In the example of FIGS. 1a and 1b, the depicted gauge pins are intended to represent the threaded shank of a micrometre screw gauge. Each gauge may be marked with a graduated scale 28, such as shown for gauge 27d in FIG. 1b, for measuring the amount of radial displacement of the shank until contact is made with the working surface 12. The scale is calibrated with reference to the situation where the shank of the gauge is in contact with the unworn working surface of an identical reference bearing.

Let us assume that for a bearing ring of the kind shown in FIGS. 1a and 1b, a maximum allowable amount of wear at any location on the working surface 12 is 200 µm and that the marking indicated with reference numeral 29 in FIG. 1b represents this radial distance from the tool second surface 26. After a period of service, the bearing ring 10 is dismounted and subjected to a maintenance inspection. The tool 20 is fitted over the inner ring 10 such that the protrusion 22 rests on the groove surface 15s and the clamping sections 24, 25 bear against the ring end faces 16, 17. The shank of each micrometer gauge 27a, 27b, 27c, 27d is inserted into the respective through hole in the tool and adjusted until contact is made with the working surface 12. Assuming wear has occurred, the shank will screw in further than when the working surface 12 was unworn and the amount of wear can be read on the scale 28. If the measured wear is close to 200 µm, the bearing ring will be discarded and a new bearing ring will be mounted in the application. If e.g. 100 µm of further radial displacement is measured relative to the calibrated situation, the bearing ring may be refitted.

The tool of the invention enables wear to be measured at a number of axially spaced locations in a straightforward manner. The process can also be easily repeated at different angular positions of the working surface.

In a second embodiment, the tool is adapted for measuring wear of a working surface of an outer bearing ring.

FIGS. 2a and 2b show views of a shackle 50, as referred to earlier, which is used to connect an aircraft engine to a pylon structure on an aircraft wing. The shackle 50 has upper and lower openings 51, 52 each of which has a spherically concave bore 51s, 52s that serves as an outer ring of a spherical plain bearing for receiving an inner ring with a spherically convex outer surface. To enable mounting, the inner ring is generally executed as a split inner ring. Typically, the inner ring associated with the upper opening 51 is mounted on a first hinge pin that is fixed to the pylon, and the inner ring associated with the lower opening 52 is mounted on a second hinge pin that is fixed to the engine casing.

In use, each bearing has a loaded zone which extends through an angular range of e.g. 120 degrees. Within the loaded zone, sliding contact between the working surfaces of the bearing rings leads to wear. The bearing rings in depicted the application experience back and forth sliding oscillations through a limited angular range. Consequently, the working surface of both the inner and outer rings has a section which never enters the loaded zone of the bearing. Typically, the split inner ring is mounted within the outer ring such that the splits are located in an unloaded zone of the bearing.

The shackle 50 is a component that is subjected to maintenance inspections, during which wear of the spherically concave working surfaces 51s, 52s can be measured using a tool 120 according to the second embodiment of the invention.

The tool 120 has a first surface that faces the working surface 51s being measured, and a protrusion 122 which extends from the first surface and is adapted to fit into a central lubrication groove 55 that is provided in the working surface 51s. Again, the tool has first and second clamping sections 124, 125 that bear against axial end faces of the shackle (outer bearing ring), such the tool is centered and aligned. A main body of the tool has through holes which extend in a radial direction from a second surface 126 of the tool to the first surface. In the depicted example, two through holes are located at either side of the protrusion 122 to enable wear measurement of the working surface 51s at four locations.

The tool is further equipped with four depth gauges 127a, 127b, 127c, 127d which are engaged in the respective through holes. As before, each gauge in this example has a shank and can be moved in radial direction relative to an axis 53 of the bearing ring. A single depth gauge that is axially moveable may also be used.

In this example, the tool is not pre-calibrated using the unworn working surface of a reference bearing, but is calibrated using a section of the working surface that is located in the unloaded zone, where no wear occurs. During the maintenance inspection, the tool 120 is initially centred and aligned on the lubrication groove 55 at an angular position on the working surface 51s that lies in the unloaded zone. The shank of each depth pin 127a, 127b, 127c, 127d is radially displaced until contact is made with the working surface 51s. The gauge reading may then be zeroed. The tool is then placed on a section of the working surfaces that lies in the loaded zone and the amount of wear is measured based on how much farther the screw gauge can be radially displaced compared with the calibrated, unworn situation.

A number of aspects/embodiments of the invention have been described. It is to be understood that each aspect/embodiment may be combined with any other aspect/embodiment. Moreover, the invention is not restricted to the described embodiments, but may be varied within the scope of the accompanying patent claims.

What is claimed is:

1. A method of determining an amount of wear in a spherical working surface of a bearing ring of a spherical plain bearing, the method comprising:
   providing a groove of predetermined depth in the working surface, when the working surface is in an unworn condition;
   after a period of service, using the groove and axial end faces of the bearing ring as reference surfaces for centering and aligning a measuring tool, the tool comprising:
   a first surface adapted to face the spherical working surface of the bearing ring, and a protrusion that extends from the first surface in a radial direction and is adapted to fit into the groove;
   first and second clamping sections that engage the axial end faces of the bearing ring; and
   two or more radial openings that extend from a second surface of the tool through to the first surface, and which are axially spaced from the protrusion;
   the method further comprising:
   measuring a radial distance with a depth gauge associated with at least one of the two or more radial openings; and
   determining the amount of wear by measuring the radial distance to the spherical working surface through each of the radial openings and comparing the measured value with a reference value measured using the tool for an unworn reference working surface comprising a reference groove of the same predetermined depth as the groove in the working surface, when the working surface is in an unworn condition.

2. The method of claim 1, wherein the bearing ring is an inner ring of the spherical plain bearing having a spherically convex working surface, or is an outer ring of the spherical plain bearing having a spherically concave working surface.

3. The method of claim 1, wherein the reference value used in the step of determining is the radial distance measured through each radial opening when then tool is centered and aligned on an unworn reference bearing ring, wherein the unworn reference bearing ring has a reference groove of the same predetermined depth as the groove in the working surface of the bearing ring, when the working surface is in an unworn condition.

4. The method of claim 1, wherein the reference groove is provided in a first section of the working surface, which is located in a loaded zone of the bearing, and is provided in a second section of the working surface, which is located in an unloaded zone of the bearing, and wherein the reference value used in the step of determining is the radial distance measured through each radial opening when then tool is centered and aligned at a location within the second section of the working surface.

5. The method of claim 1, wherein the groove has a depth that is greater than a maximum allowable amount of wear of the working surface.

6. The method of claim 1, wherein the step of providing the groove comprises providing a number of circumferentially spaced grooves in the spherical working surface at an axially central location.

7. The method of claim 1, wherein the step of providing the groove comprises providing a continuous annular groove in the spherical working surface at an axially central location.

8. The method of claim 7, wherein the groove further serves as a lubrication channel.

9. The method of claim 1, wherein the working surface of the bearing ring is provided with a machinable liner of self-lubricating material.

* * * * *